US011218593B2

(12) United States Patent
Zanon

(10) Patent No.: US 11,218,593 B2
(45) Date of Patent: Jan. 4, 2022

(54) METHOD AND SYSTEM FOR COMMUNICATION

(71) Applicant: Nuway IP Holdings Pty Ltd, Sassafras (AU)

(72) Inventor: Peter Zanon, Sassafras (AU)

(73) Assignee: NUWAY IP HOLDINGS PTY LTD, Sassafras (AU)

( * ) Notice: Subject to any disclaimer, the term of this patent is extended or adjusted under 35 U.S.C. 154(b) by 0 days.

(21) Appl. No.: 17/049,566

(22) PCT Filed: May 6, 2019

(86) PCT No.: PCT/AU2019/050411
§ 371 (c)(1),
(2) Date: Oct. 21, 2020

(87) PCT Pub. No.: WO2019/213696
PCT Pub. Date: Nov. 14, 2019

(65) Prior Publication Data
US 2021/0067630 A1 Mar. 4, 2021

(30) Foreign Application Priority Data
May 7, 2018 (AU) .................. 2018901547

(51) Int. Cl.
*H04M 3/51* (2006.01)
*H04M 3/42* (2006.01)
*H04N 7/14* (2006.01)

(52) U.S. Cl.
CPC ......... *H04M 3/51* (2013.01); *H04M 3/42221* (2013.01); *H04N 7/147* (2013.01); *H04M 2201/50* (2013.01); *H04M 2203/301* (2013.01)

(58) Field of Classification Search
USPC .................................... 379/265.02
See application file for complete search history.

(56) References Cited

U.S. PATENT DOCUMENTS

2015/0281445 A1\* 10/2015 Kumar ............... H04M 3/5175
379/88.01

FOREIGN PATENT DOCUMENTS

WO    WO 2011/060140 A1    5/2011

OTHER PUBLICATIONS

International Search Report received in corresponding PCT Application No. PCT/AU2019/050411 dated Jul. 18, 2019.

\* cited by examiner

*Primary Examiner* — Amal S Zenati
(74) *Attorney, Agent, or Firm* — Knobbe Martens Olson & Bear, LLP

(57) ABSTRACT

A method of communicating between an operator server and a user device for recording audio and/or video data includes the operator server receiving video data and/or audio data from the user device; the operator server initiating a session with an operator interface, wherein the session is initially in a pre-interaction mode and in response to receiving an instruction from the operator interface to change the session to an interaction mode, control the operator interface in order to change the session to an interaction mode, wherein, when in the interaction mode, a user of the user device and an operator of the operator interface are enabled to communicate with one another. The operator server is configured to begin recording of the video data and/or audio data before controlling the operator interface to change to the interaction mode and to continue recording received video data and/or audio data after said change.

20 Claims, 7 Drawing Sheets

METHOD AND SYSTEM FOR COMMUNICATION

CROSS REFERENCE TO RELATED APPLICATIONS

The present application is a U.S. national phase application under 35 U.S.C. § 371 of International Application No. PCT/AU2019/050411, filed on May 6, 2019, which claims priority to AU Application No. 2018901547, filed on May 7, 2018. The content of each of these applications is incorporated herein by reference in its entirety.

FIELD OF THE INVENTION

The invention generally relates to a method and system for communication between parties.

BACKGROUND TO THE INVENTION

It is known that a user of a smartphone or similar portable digital device can make a phone call to a call centre or the like. Such call centres may provide recording functionality, such that a conversation between the user and an operator at the call centre is recorded and archived. For example, it may be desirable to record a conversation for evidentiary or training purposes. Generally, improvements and developments in such systems are desired.

SUMMARY OF THE INVENTION

According to another aspect of the present invention, there is provided a method of operating an operator server to communicate with a user device, wherein the operator server is interfaced with an operator interface, comprising the steps of: receiving a request to initiate data communication from a user device and in response, initiating said data communication; receiving video data and/or audio data from the user device; recording the video data and/or audio data in a data storage; initiating a session with the operator interface, wherein the session is initially in a pre-interaction mode; in response to receiving an instruction from the operator interface to change the session to an interaction mode, controlling the operator interface in order to change the session to an interaction mode, wherein, when in the interaction mode, the operator interface is in direct communication with the user device such that the a user of the user device and an operator of the operator interface are enabled to communicate with one another, and wherein the operator server is configured to begin recording of the video data and/or audio data before controlling the operator interface to change to the interaction mode and to continue recording received video data and/or audio data after said change.

The video data and/or audio data may be received via a 3G, 4G, or 5G mobile communication. More generally, the data communication may utilise a mobile standard having sufficient bandwidth for implementing the functionality herein described.

Optionally, the data storage is located remotely to the operator server and wherein the received video data and/or audio data is communicated over a network to the data storage. Alternatively, the data storage is a component of the operator server.

The method optionally further comprises the step of receiving additional data from the user device and recording the additional data in the data storage in association with the recorded video data and/or audio data. The additional data may include location data indicating a location of the user device.

According to an aspect of the present invention, there is provided a method of operating a user device to communicate with an operating server, comprising the steps of: identifying an input made by a user of the user device; in response, initiating data communication with the operating server, wherein the data communication includes communication via a network; obtaining video data from a camera of the user device and/or audio data from a microphone of the user device; communicating the video data and/or audio data to the operating server; and in response to identifying that an interaction mode of a session associated with the data communication, enabling direct communication between the user and an operating interface associated with the operating server, wherein the user device is configured to begin communication of the video data and/or audio data before identifying the interaction mode and is configured to continue communicating video data and/or audio data after identifying the interaction mode, such that when in the interaction mode the a user of a user device and an operator of the operator interface are enabled to communicate with one another.

The input may correspond to receiving a touch by the user on a touch screen of the user device. Alternatively, or in addition, the input may correspond to the user device identifying a predetermined motion of the user device has occurred. Alternatively, or in addition, the input may be received from an external device.

The data communication may occur via a 3G, 4G, or 5G mobile connection. More generally, the data communication may utilise a mobile standard having sufficient bandwidth for implementing the functionality herein described.

Optionally, the user device includes two or more cameras and the method further comprises the step of receiving an instruction from the user to switch recording from one of the cameras to another of the cameras. Also optionally, the user device includes two or more cameras and is configured to record from both cameras at the same time.

The direct communication may correspond to a two-way audio communication between the user device and the operator interface.

The method optionally further comprises the step of the user device receiving, from the operator server, indicating acceptance of the data communication before the user device begins communicating the video data and/or audio data to the operating server.

The method optionally further comprises the step of communicating additional data to the operator server. The additional data may include a location of the user device.

Preferably, both video data and audio data is communicated to the operator server.

According to another aspect of the present invention, there is provided a method of communicating between a user device and an operator server, comprising the steps of: identifying an input made by a user of the user device; in response, the user device initiating data communication with the operating server, wherein the data communication includes communication via a network; obtaining video data from a camera of the user device and/or audio data from a microphone of the user device; the user device communicating the video data and/or audio data to the operator server and the operator server receiving said video data and/or audio data; and the operator server recording the video data and/or audio data in a data storage; the operator server initiating a session with the operator interface, wherein the session is initially in a pre-interaction mode; in response to receiving an instruction from the operator interface to change the session to an interaction mode, the operator server controlling the operator interface in order to change the session to an interaction mode, wherein, when in the interaction mode, the operator interface is in direct communication with the user device such that the a user of the user device and an operator of the operator interface are enabled to communicate with one another, and wherein the user device is configured to begin communication of the video data and/or audio data before identifying the interaction mode and is configured to continue communicating video data and/or audio data after identifying the interaction mode.

According to another aspect of the present invention, there is provided a method of communicating between a user device and an operator server, comprising the steps of: identifying an input made by a user of the user device; in response, the user device initiating data communication with the operating server, wherein the data communication includes communication via a network; obtaining video data from a camera of the user device and/or audio data from a microphone of the user device; the user device communicating the video data and/or audio data to the operator server and the operator server receiving said video data and/or audio data; and the operator server recording the video data and/or audio data in a data storage.

According to another aspect of the present invention, there is provided a method of operating an operator server to communicate with a user device, wherein the operator server is interfaced with an operator interface, comprising the steps of: receiving a request to initiate data communication from a user device and in response, initiating said data communication; receiving video data and/or audio data from the user device; recording the video data and/or audio data in a data storage.

According to another aspect of the present invention, there is provided a method of operating a user device to communicate with an operating server, comprising the steps of: identifying an input made by a user of the user device; in response, initiating data communication with the operating server, wherein the data communication includes communication via a network; obtaining video data from a camera of the user device and/or audio data from a microphone of the user device and/or display data of a display of the user device; communicating the video data and/or audio data and/or display data to the operating server; and in response to identifying that an interaction mode of a session associated with the data communication, enabling direct communication between the user and an operating interface associated with the operating server, wherein the user device is configured to begin communication of the video data and/or audio data before identifying the interaction mode and is configured to continue communicating video data and/or audio data after identifying the interaction mode such that, when in the interaction mode, the a user of the user device and an operator of the operator interface are enabled to communicate with one another.

According to another aspect of the present invention, there is provided a method of communicating between a user device and an operator server, comprising the steps of: identifying an input made by a user of the user device; in response, the user device initiating data communication with the operating server, wherein the data communication includes communication via a network; obtaining video data from a camera of the user device and/or audio data from a microphone of the user device and/or display data of a display of the user device; the user device communicating the video data and/or audio data and/or display data to the operator server and the operator server receiving said video data and/or audio data; and the operator server recording the video data and/or audio data in a data storage.

According to another aspect of the present invention, there is provided a communication system comprising one or more user devices, an operator server interfaced with an operator interface and a data storage, wherein the one or more user devices are configured for communication with the operator server via a network, and wherein each user device is configured to: identify an input made by a user of the user device; in response, initiate data communication with the operating server, wherein the data communication includes communication via a network; obtain video data from a camera of the user device and/or audio data from a microphone of the user device; communicate the video data and/or audio data to the operating server; and in response to identifying that an interaction mode of a session associated with the data communication, enable direct communication between the user and an operating interface associated with the operating server, and wherein the operator server is configured to: receive a request to initiate data communication from a user device and in response, initiating said data communication; receive video data and/or audio data from the user device; record the video data and/or audio data in a data storage; initiate a session with the operator interface, wherein the session is initially in a pre-interaction mode; in response to receiving an instruction from the operator interface to change the session to an interaction mode, control the operator interface in order to change the session to an interaction mode, wherein, when in the interaction mode, the operator interface is in direct communication with the user device such that the a user of the user device and an operator of the operator interface are enabled to communicate with one another, and wherein the operator server is configured to begin recording of the video data and/or audio data before controlling the operator interface to change to the interaction mode and to continue recording received video data and/or audio data after said change.

According to yet another aspect of the present invention, there is provided a communication system comprising one or more user devices, an operator server interfaced with an operator interface and a data storage, wherein the one or more user devices are configured for communication with the operator server via a network, and wherein each user device is configured to: identify an input made by a user of the user device; in response, initiate data communication with the operating server, wherein the data communication includes communication via a network; obtain video data from a camera of the user device and/or audio data from a microphone of the user device; and communicate the video data and/or audio data to the operating server, and wherein the operator server is configured to: receive a request to initiate data communication from a user device and in response, initiating said data communication; receive video data and/or audio data from the user device; and record the video data and/or audio data in a data storage.

According to still yet another aspect of the present invention, there is provided a computer program comprising code configured to cause a computer to implement the method of any one of the above methods when said code is executed by the computer.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
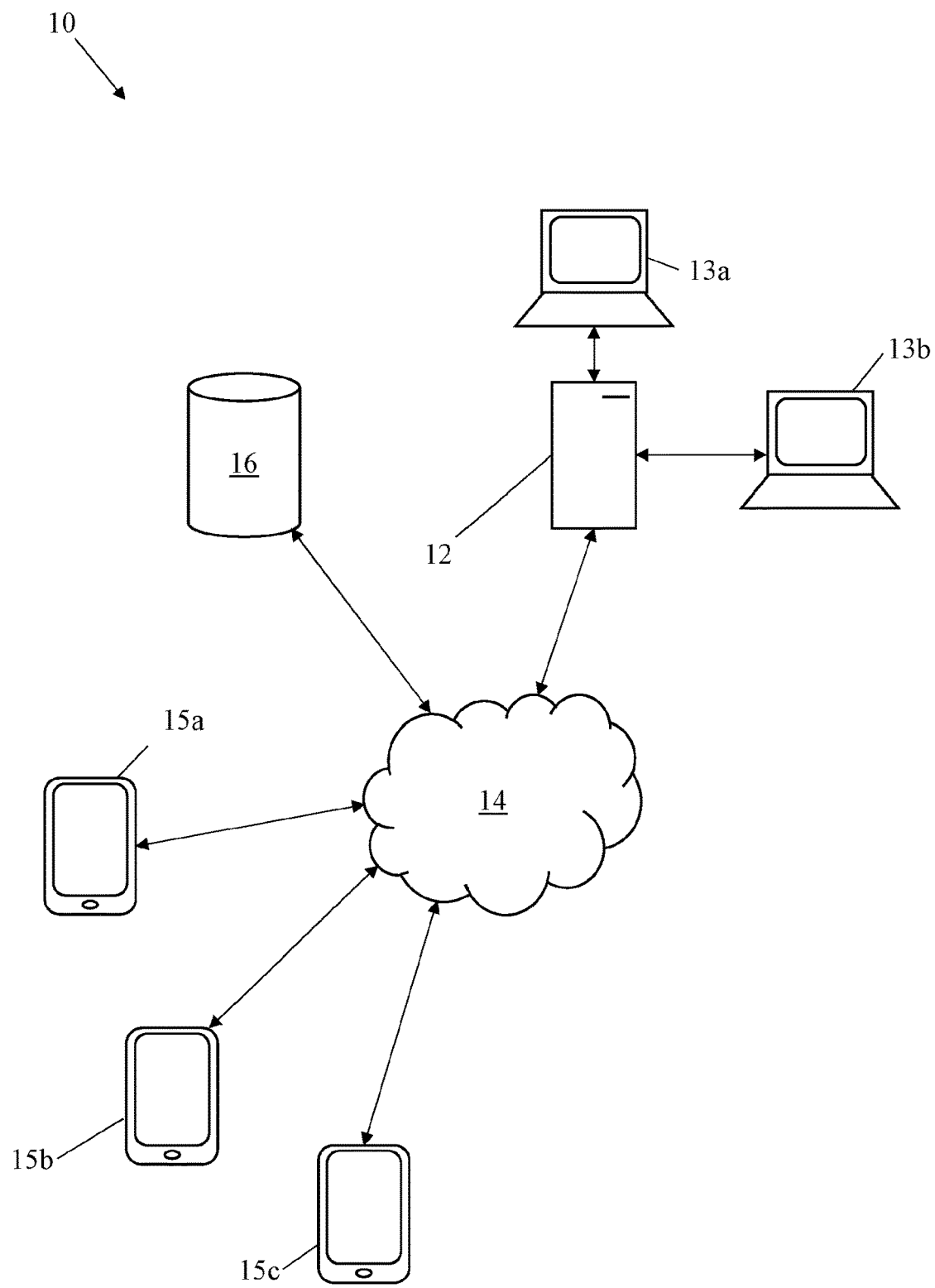
FIG. 1 shows a communication system according to an embodiment.

FIG. 1 shows a communication system 10 according to an embodiment. The system 10 comprises an operator server 12 and at least one operator interface 13 interfaced with the operator server 12. Typically, the communication system 10 comprises a plurality of operator interfaces 13 interfaced with the operator server 12 (two are shown, as an example, in the figure). The operator server 12 is in data communication with a network 14—this network typically comprises the Internet. The system 10 also comprises one or more user devices 15 (three user devices 15a, 15b, and 15c are shown in the figure), themselves each in data communication with the network 14. The user devices 15 are thereby configured for data communication with the operator server 12 via the network 14. The operator server 12 is interfaced with a data storage 16. In the embodiment shown, the data storage 16 is "offsite" and therefore shown separate to the operator server 12—in the example shown, the data storage 16 is accessible via the network 14. For example, the data storage 16 is a cloud-based data storage offered by a third party. In another embodiment (not shown), the data storage is a component of the operator server 12.

Figure 2:
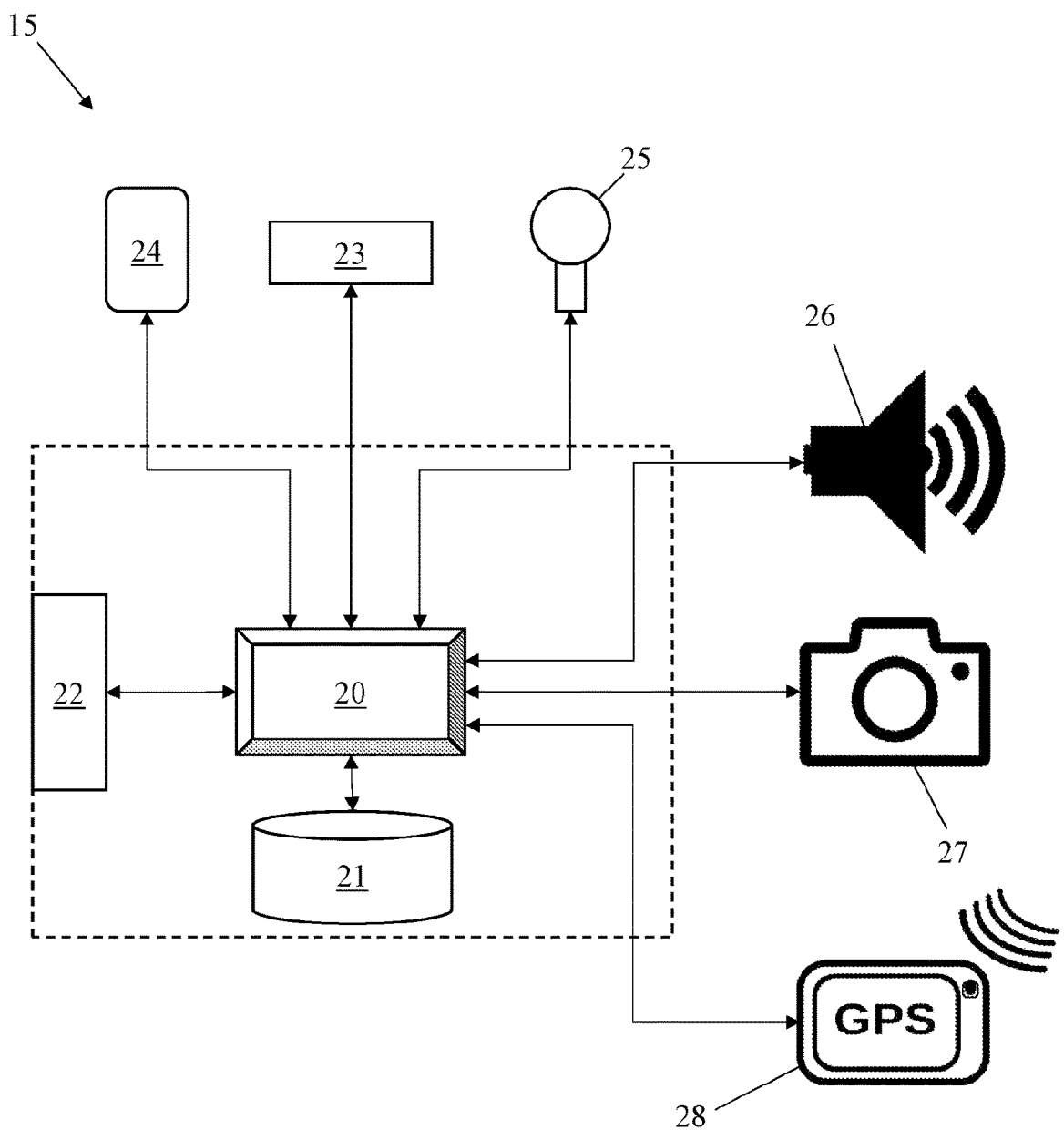
FIG. 2 shows a schematic representation of a user device.

Referring to FIG. 2, the user devices 15 are typically portable devices such as mobile communication devices (e.g. smartphones; tablets; etc.). As such, the user devices 15 are typically programmable computing devices having, for example, a processor 20 interfaced with a memory 21, a network interface 22, at least one user input module 23, a display 24, an audio input 25, an audio output 26, and at least one camera 27. In a general sense, the processor 20 may include a single CPU core, a plurality of CPU cores, or any other suitable processing arrangement. The user device 15 will typically include any additional circuitry required to provide the functionality described herein. It is envisaged that the user device 15 is configurable by installation and execution of software configured such as to cause the user device 15 to implement the functionality described herein— for example, through installation and execution of computer software in the form of an application (colloquially referred to as an "app") downloaded from an "app store". The memory 21 typically comprises at least a volatile memory and a non-volatile memory. The network interface 22 typically includes a wireless network interface (for example, including at least one of a mobile broadband interface 22a and a WiFi (or similar) interface 22b). The user device 15 may also comprise a location sensor module 28 configured to enable the user device 15 to determine its location. The location sensor module 28 is interfaced with the processor 20.

A user input module 23 may be provided that is integral with the display 24—for example, in the form of a touch screen. Another user input module 23 may correspond to a motion sensor of the user device 15. Another user input module 23 may correspond to an audible command sensor (which utilises audio input 25). Another user input module 23 may correspond to the user speaking aloud a voice command which is received and processed by the user device 15. In an embodiment, the user input module 23 is an external device (that is, one separate to the user device 15) which provides a signal, for example via wired or wireless (such as Bluetooth) communication, to the user device 15. In a general sense, user input modules 23 are configured to enable a user to control operation of the user device 23.

Figure 3:
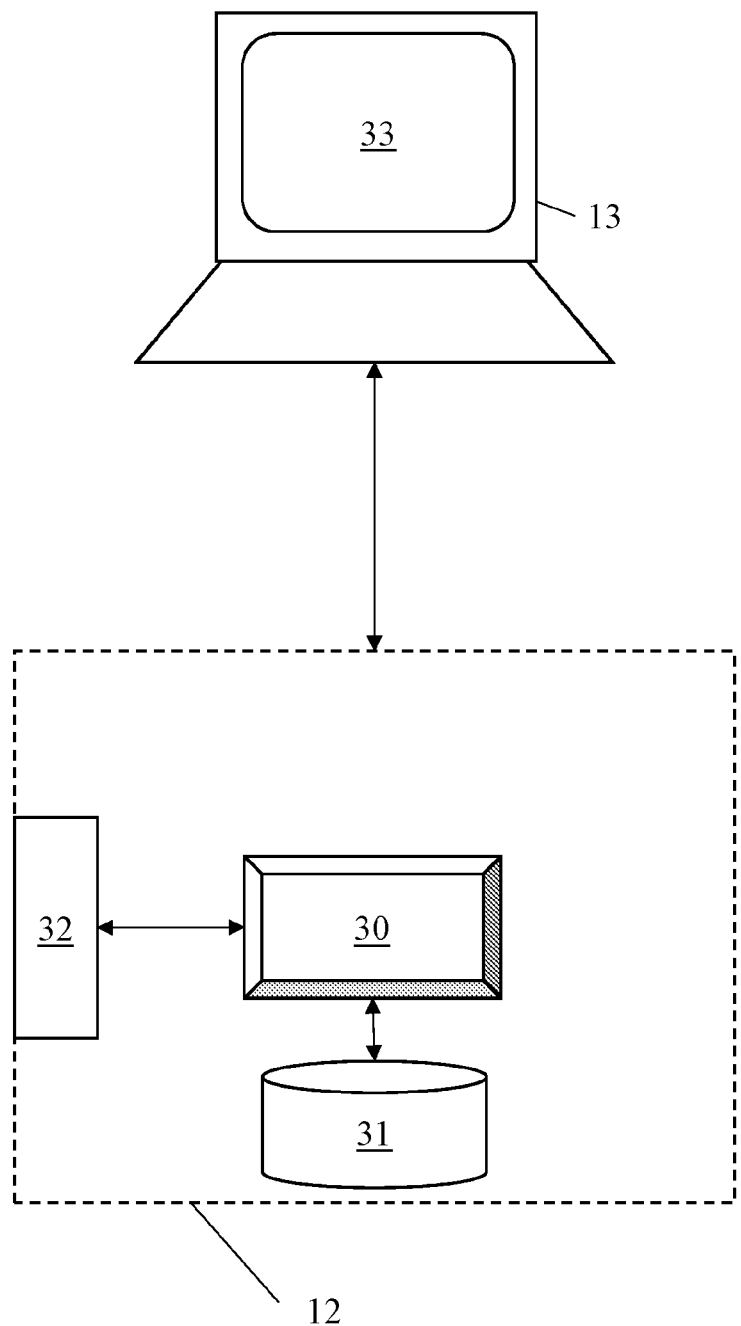
FIG. 3 shows a schematic representation of an operator server.

Referring to FIG. 3, the operator server 12 and one operator interface 13 according to an embodiment is shown. The operator interface 13 is configured to enable an operator (being an individual or a group of individuals) to interact with the operator server 12. The operator server 12 and operator interface 13 may be embodied in a single computing device. Alternatively, the, or each, operator interface 12 is in data communication with the operator server 12 (for example, via network 14 or via a separate internal intranet). Although reference is made herein to an operator server 12 interfaced with operator interfaces 13, in a more general sense, the operator server 12 and the operator interface(s) 13 are configured to provide the functionality described herein and are enabled for data communication with the user device(s) 15 and for interaction with operator(s).

The operator server 12 is a computing device and therefore includes processor 30 interfaced with memory 31 and network interface 32. In a general sense, the processor 30 may include a single CPU core, a plurality of CPU cores, a plurality of computing devices operating as a single device (e.g. via a cloud server implementation) or any other suitable processing arrangement. It is envisaged that the operator device 12 is configurable by installation and execution of software configured such as to cause the operator device 12 to implement the functionality described herein. The memory 31 typically comprises at least a volatile memory and a non-volatile memory. The network interface 32 is typically a wired network interface (e.g. an Ethernet interface 32a) although other network interfaces are envisaged, including utilising wireless communication.

Figure 4:
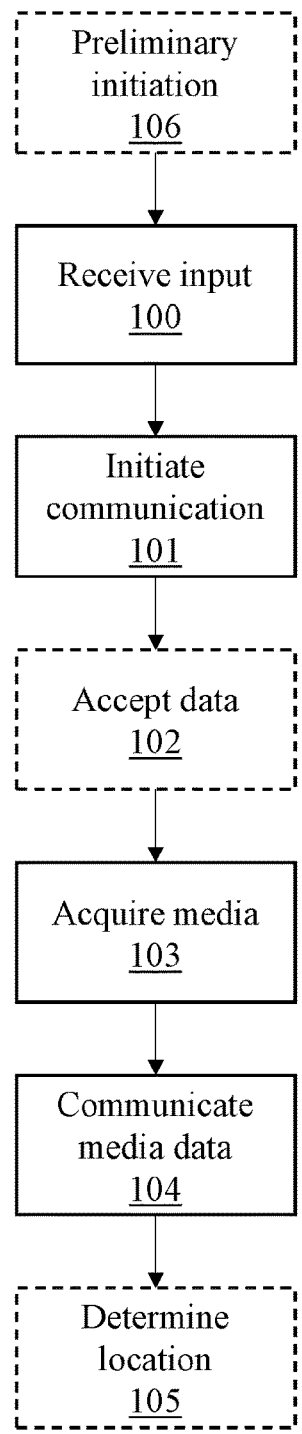
FIG. 4 shows a method of operation of a user device.

Referring to FIG. 4, the user device 15 is configured to implement a method by which a user is enabled to initiate data communication between the user device 15 and the operator server 12. The user device 15 receives an input corresponding to an activation action from the user via a user input module 23, at input reception step 100. The input may correspond to receiving a touch input (when the user input module 23 includes a touch screen) signifying the activation action—for example, the user device 15 may present an image comprising a button to be touched by the user. The input may instead correspond to the user device 15 detecting a predetermined movement of the user device 15—for example, the user device 15 may be configured to identify when the user shakes the user device 15 (typically for a predetermined length of time). In one implementation, the user is prompted to touch the screen upon detection of the predetermined movement. The input may instead correspond to the user device 15 receiving a signal from an external device.

In an embodiment, the input is disguised or hidden, such that a third party (i.e. another person) within the vicinity of the user and their user device 15 may find it difficult to identify that the input has occurred. In one example, the input corresponds to a touch action on a touch screen display 24. However, the prompt to touch the screen is concealed within an unrelated interface. It is envisaged that third party applications offering services unrelated to that described herein may include the facility that the user can provide the input as according to embodiments described herein. In one illustrative example, an application providing access to meal recipes may include a hidden option for providing the input. According to this embodiment, the functionality herein described may be activated without it being apparent to the third party.

In response to receiving the input, the user device 15 initiates data communication with the operator server 12, at communication initiation step 101. The user device 15 is typically configured to communicate with the network 14 via a mobile broadband connection, for example a 3G or preferably a 4G or 5G mobile broadband connection. More generally, the data communication may utilise a mobile standard having sufficient bandwidth for implementing the functionality herein described. A WiFi connection may be used when available, depending on the implementation, either in preference to the mobile broadband connection or in instances where the mobile broadband connection is not present or of low quality. The user device 15 optionally then receives a message from the operator server 12 indicating acceptance of the data communication, at data acceptance step 102.

The user device 15 then obtains video data and/or audio data from its camera 27 and audio input 25 (respectively), at media data acquisition step 103. For the purposes of the discussion herein, it is assumed that both video data and audio data is obtained (which is collectively referred to as "media data")—however, it is envisaged that implementations may utilise only one of these. The user device 15 then communicates the obtained media data to the operator server 12, at data communication step 104.

In an embodiment, in situations where the data communication between the user device 15 and operator server 12 is of insufficient bandwidth to communicate the media data, the user device 15 is configured to implement buffering such that chunks of media data is communicated at a time. Although this may reduce or render impossible real-time communication of the media data, such an embodiment may ensure that the media data is ultimately communicated to the operator server 12 despite the low bandwidth.

The operator server 12 is configured to store the received media data to be stored in the data storage 16. Typically, the operator server 12 will store the received media data in association with additional data. For example, the additional data can include a user device ID associated with the user device 15, communicated to the operator server 12 from the user device 15, configured to enable identification of the source of the video data and audio data. In another example, the additional data can include a start time, indicating the time at which the data communication was initiated. In embodiments having an external data storage 16, the operator server 12 is configured to communicate the media data and, where applicable, additional data to the data storage 16.

Referring back to FIG. 4, in an embodiment, the user device 15 is configured to determine a location of the user device 15 using its location sensor module 28. The user device 15 is typically configured to obtain the most accurate location currently available (for example, to prefer GPS over alternative location sensing means). The user device 15 communicates the location to the operator server 12 in association with the media data, at location determination and send step 105. In an embodiment, the location determination is continuously updated and communicated to the operator server 12. The operator server 12 may receive the location as additional data, and therefore store the location data in association with the media data.

FIG. 4 shows an optional additional preliminary initiation step 106. The user device 15 initiates a preliminary data connection with the operating server 12, creating a communication channel that may be used (upon proceeding to step 100) by the user device 15 and operating server 12 to undertake the communication of the following steps. For example, the initiation can correspond to use of the SIP (Session Initiation Protocol) to set up the data connection. The initiation step 106 can be automatically performed in response to activation of software implementing the user device 15 functionality (e.g. opening an associated "app").

Figure 5A:
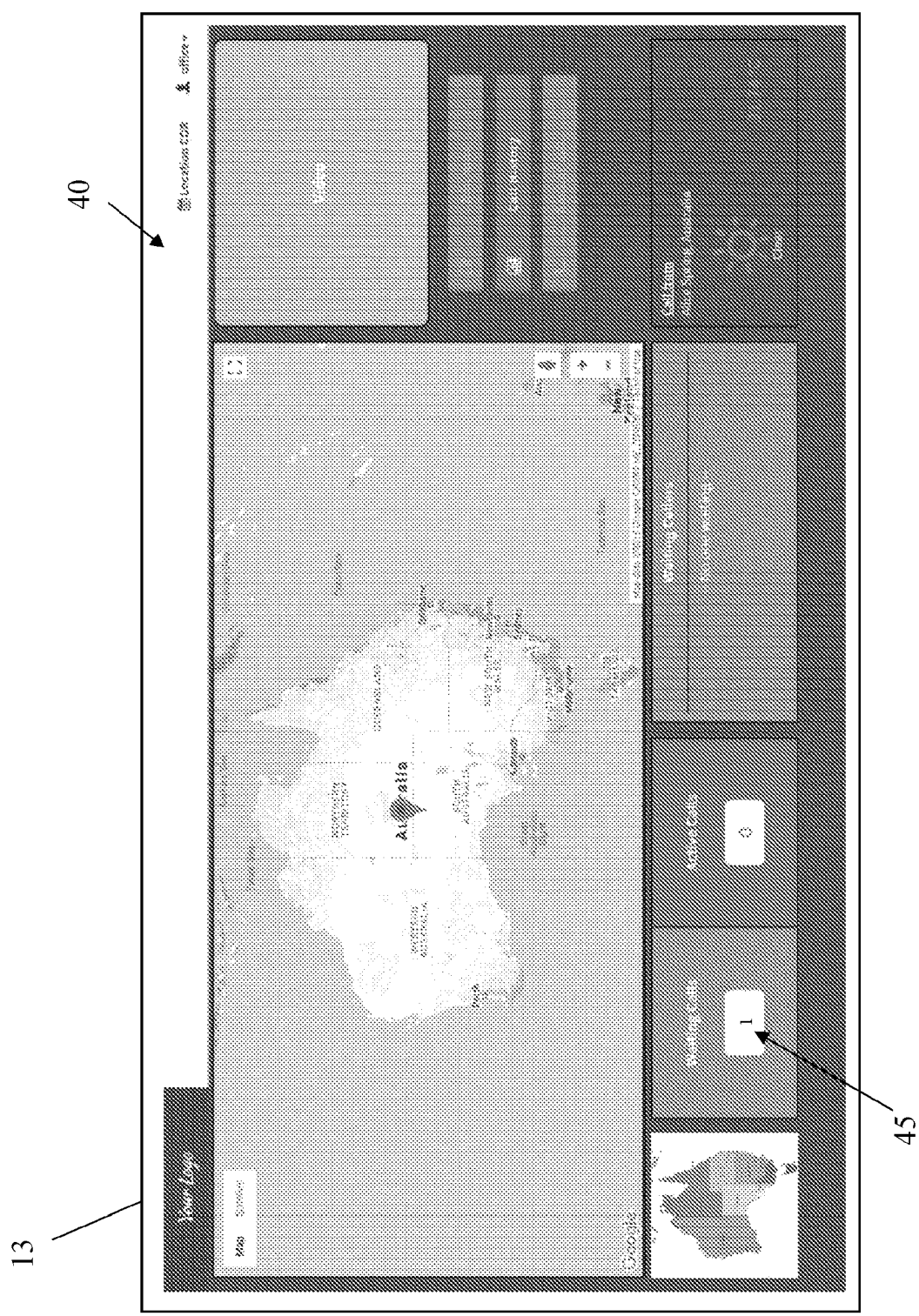
FIG. 5a shows a session in a pre-interaction mode.
Figure 5B:
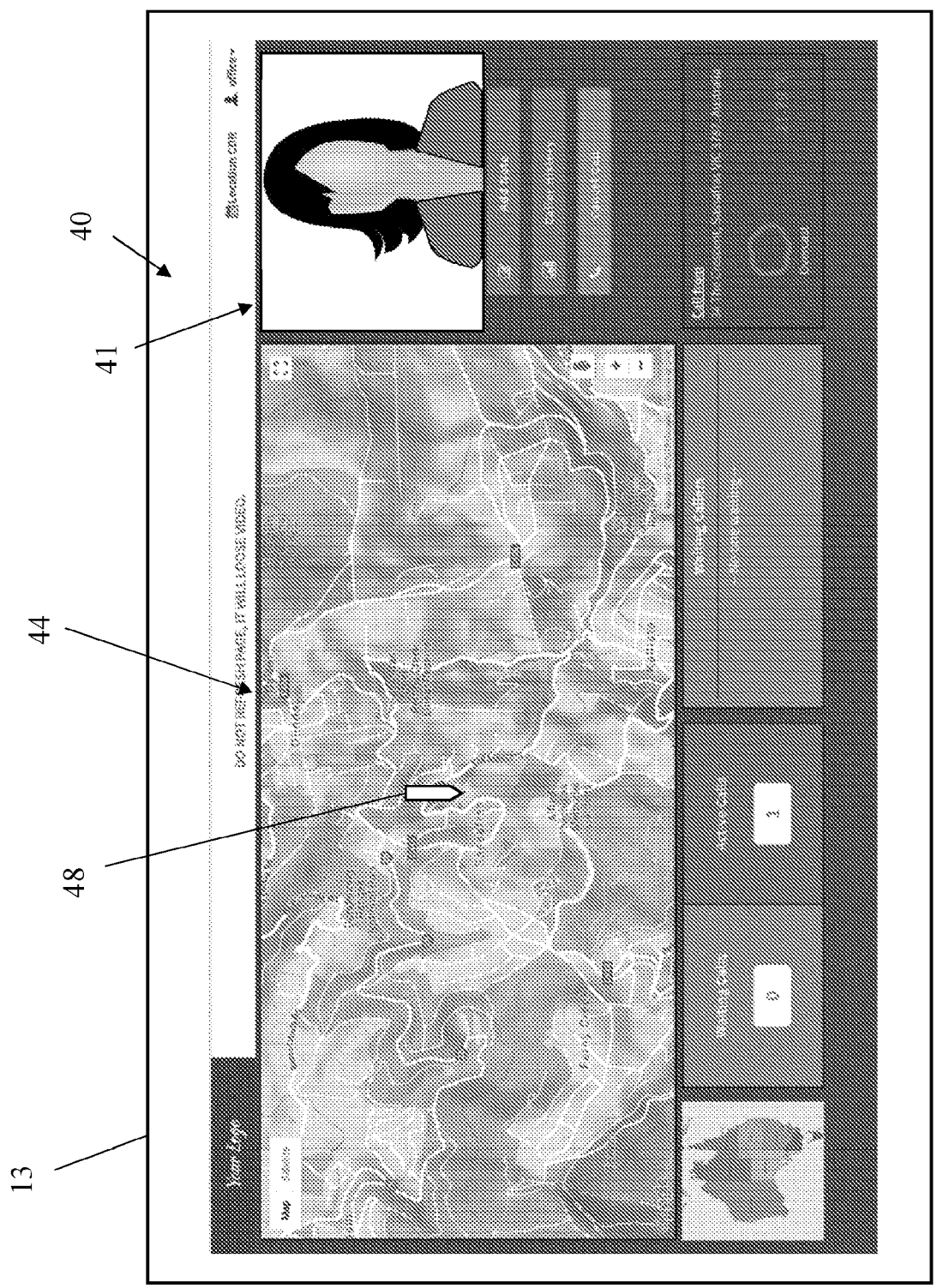
FIG. 5b shows a session in an interaction mode.

Referring to FIGS. 5a and 5b, the operator server 12 is configured to initiate a session 40 with the operator interface 13. A session 40 corresponds to the operator interface 13 displaying information relating to the data communication with the user device 15 to the operator.

FIG. 5a shows pre-interaction mode of the session 40. Here, the operator interface 13 is configured to show a notification 45 that communication with a particular user device 15 has been initiated. It should be apparent that at this stage, the operator is not in direct communication with the user of the user device 15. The user may be, for example, in a "hold queue". Optionally, a video is presented showing video data received from the user device 15; generally, during the pre-interaction mode, it is preferred to not present the audio data.

FIG. 5b shows an interaction mode of the session 40. Here, the operator is in direct communication with the user (i.e. via the data connection between the operator server 12 and the user device 15). Typically, a video derived from the media data is shown in video window 41, and the operator is able to receive the audio component of the media data via a speaker 42 (not shown in FIG. 5b) of the operator interface 13 (e.g. via a headset). The operator is also enabled to speak to the user via a microphone 43 (not shown in FIG. 5b) of the operator interface 13 (again, for example, via a headset). FIG. 5b also shows a map window 44 providing an indication of the location 48 of the user device 15—this is particularly applicable where the user device 15 is configured to communicate location information to the operator server 12.

The operator server 12 interacts with the operator interface 13 in response to initiation of data communication with a user device 15. The operator server 12, upon receiving data communication from the user device 15, communicates an instruction to the operator interface 13 to present the notification 45 (e.g. see FIG. 5a) indicating that the data communication is occurring. After displaying the notification, the operator server 12 awaits an instruction to initiate video communication between the operator interface 13 and the user device 15 and audio communication between the operator interface 13 and the user device 15.

In an embodiment, the operator server 12 is configured to receive the instruction from the operator interface 13. The operator is enabled to interact with the operator interface 13 to cause the instruction to be communicated to the operator server 12. In an example, the notification is displayed on a display 33 of the operator interface 13. The operator is enabled to interact with the operator interface 13 (for example, via a keyboard, mouse, touchscreen, or combination of these) to effectively "select" the communication associated with the notification. In respect, the operator interface 13 provides the instruction to the operator server 12.

The system 10 is configured to provide recording of the video data and audio data at the data storage 16 before the operator is in communication with the user, and during communication with the user. Therefore, advantageously, the video data and audio data is recorded from (effectively) the point in time at which the user device 15 initiates communication with the operator server 12 (there may be a delay, and in particular, the video data may be recorded from a later point in time than the audio data, or vice versa). Recording then continues after initiation of the communication.

In an embodiment, the user is enabled to control the user device 15 to select between multiple cameras 27 of the user device 15. Therefore, the user may control which camera 27 is obtaining video data for communication to the operating server 12. It is envisaged that an embodiment will enable recording from each camera 27 of a multi-camera user device 15, and each of the obtained video data will be communicated to the operating server 12 (and, as a result, recorded in the data storage 16).

In an embodiment, the user device 15 is configured to display obtained video data as a video on its display 24.

The embodiment shown in FIG. 5*b* includes the optional feature of displaying a photo 46 associated with the user device 15.

Figure 6:
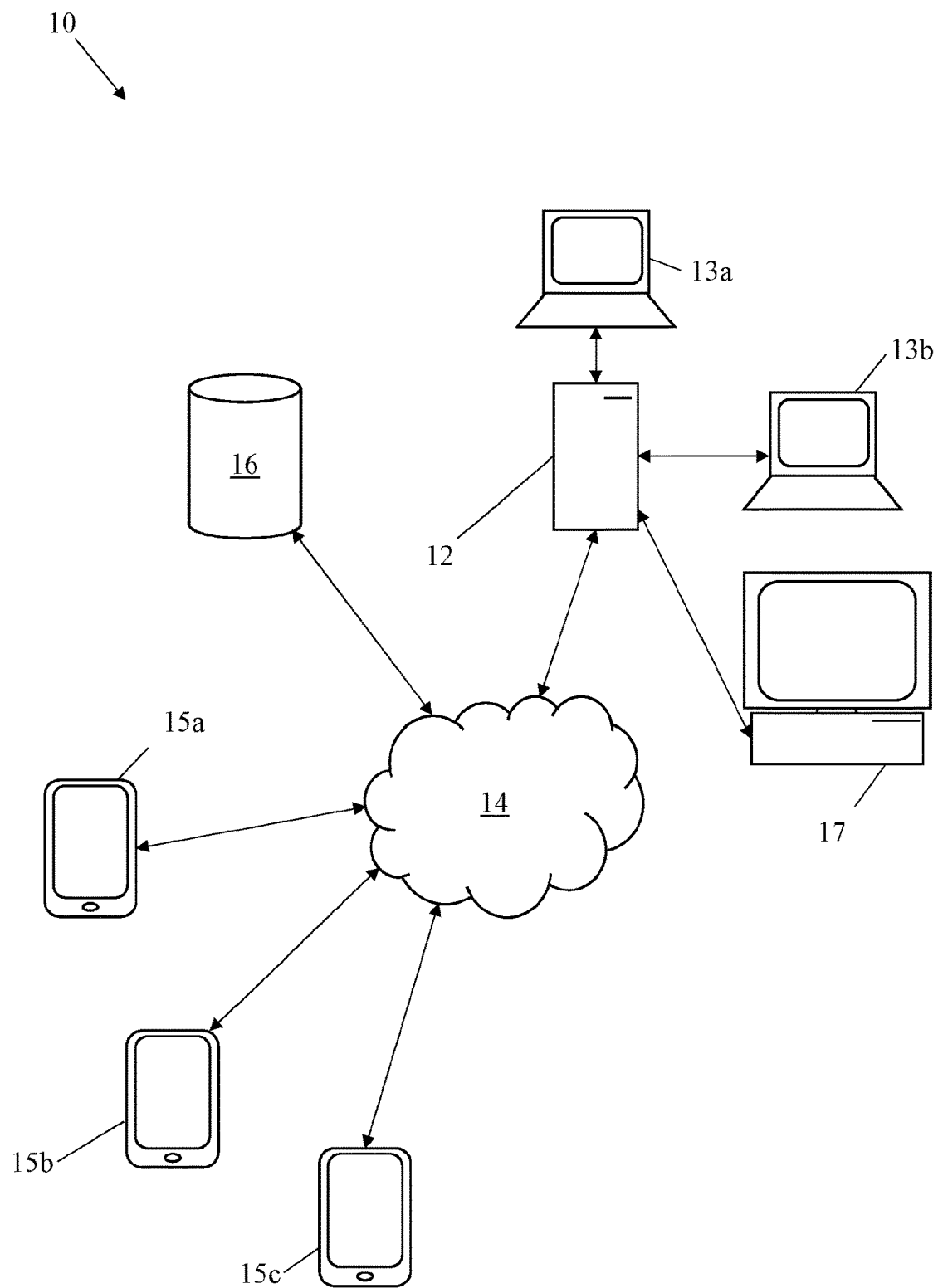
FIG. 6 shows a modification to the system of FIG. 1 including an administrator interface.

Referring to FIG. 6, the system 10 of FIG. 1 is shown with an additional administrator interface 17 which can be provided by an operating server 12 or a separate computing device. The administrator interface 17 allows an administrator (being a type of user of the system 10) to access recorded information from the data storage 16. For example, the administrator interface 17 allows for playback of recorded media or copying of the recorded media (for example, to provide as evidence). The administrator interface 17 may also enable any other control functions to interact with the data storage 16, for example, including management of stored information. Generally, functionality described with reference to the administrator interface 17 may be implemented separately (e.g. such that one administrator may only access stored media data where another administrator can delete stored media data).

According to an embodiment, the functionality described with reference to FIGS. 5*a* and 5*b* is modified such that the user is not put into direct communication with the operator. This may be advantageous, for example, where the user wishes to obtain a record of an event without alerting third parties in the vicinity of the user that a data communication is in progress. In one implementation, the operator interface 13 is utilised; the operator is however not enabled to communicate to the user (but may be able to observe media data). In another implementation, the operator interface 13 is not utilised.

Further modifications can be made without departing from the spirit and scope of the specification. In one example, the media data comprises the currently displayed information on the display 24 of the user device 15 ("display data")—i.e. a screenshot or screen recording. This may be in addition to, or alternatively to, either or both of the video data and audio data described herein. Thus, the user device 15 can be enabled to communicate a sequence of images showing the display 24. This may be advantageous, for example, where evidence of the user's activity is required and/or evidence of information, such as text or images, received by the user device from a third party (e.g. via a messaging system) is required.

The invention claimed is:

1. A method of operating an operator server to communicate with a user device, wherein the operator server is interfaced with an operator interface, comprising the steps of:
   receiving a request to initiate data communication from a user device and in response, initiating said data communication, wherein the request is provided by a hidden option in a third party application running on the user device, in which a prompt for the request is concealed within the third party application;
   receiving video data and/or audio data from the user device, wherein, in a low bandwidth case, the user device buffers the video and/or audio data and communicates it in chunks;
   recording the video data and/or audio data in a data storage;
   initiating a session with the operator interface, wherein the session is initially in a pre-interaction mode; and
   in response to receiving an instruction from the operator interface to change the session to an interaction mode, controlling the operator interface in order to change the session to the interaction mode,
   wherein, when in the interaction mode, the operator interface is in direct communication with the user device such that a user of the user device and an operator of the operator interface are enabled to communicate with one another, and wherein the operator server is configured to begin recording of the video data and/or audio data before controlling the operator interface to change to the interaction mode and to continue recording received video data and/or audio data after said change.

2. A method as claimed in claim 1, wherein the video data and/or audio data is received via a 3G, 4G, or 5G mobile communication.

3. A method as claimed in claim 1, wherein the data storage is located remotely to the operator server and wherein the received video data and/or audio data is communicated over a network to the data storage.

4. A method as claimed in claim 1, wherein the data storage is a component of the operator server.

5. A method as claimed in claim 1, further comprising the step of receiving additional data from the user device and recording the additional data in the data storage in association with the recorded video data and/or audio data.

6. A method as claimed in claim 5, wherein the additional data includes location data indicating a location of the user device.

7. A method as claimed in claim 1, comprising receiving at least video data from the user device.

8. A method of operating a user device to communicate with an operating server, comprising the steps of:
   identifying an input made by a user of the user device, wherein the input is provided by a hidden option in a third party application running on the user device, in which a prompt for the input is concealed within the third party application;
   in response, initiating data communication with the operating server, wherein the data communication includes communication via a network;
   obtaining video data from a camera of the user device and/or audio data from a microphone of the user device;

communicating the video data and/or audio data to the operating server, wherein, in a low bandwidth case, the user device buffers the video and/or audio data and communicates it in chunks; and in response to identifying that an interaction mode of a session associated with the data communication, enabling direct communication between the user and an operating interface associated with the operating server, wherein the user device is configured to begin communication of the video data and/or audio data before identifying the interaction mode and is configured to continue communicating video data and/or audio data after identifying the interaction mode such that the user of the user device and an operator of the operator interface are enabled to communicate with one another.

9. A method as claimed in claim 8, wherein the input corresponds to the user device identifying a predetermined motion of the user device has occurred.

10. A method as claimed in claim 8, wherein the data communication occurs via a 3G, 4G, or 5G mobile connection.

11. A method as claimed in claim 8, wherein the user device includes two or more cameras and comprising the step of receiving an instruction from the user to switch recording from one of the cameras to another of the cameras.

12. A method as claimed in claim 8, wherein the user device includes two or more cameras and is configured to record from both cameras at the same time.

13. A method as claimed in claim 8, wherein the direct communication corresponds to a two-way audio communication between the user device and the operator interface.

14. A method as claimed in claim 8, further comprising the step of the user device receiving, from the operator server, indicating acceptance of the data communication before the user device begins communicating the video data and/or audio data to the operating server.

15. A method as claimed in claim 8, further comprising the step of communicating additional data to the operator server.

16. A method as claimed in claim 15, wherein the additional data includes a location of the user device.

17. A method as claimed in claim 8, wherein at least video data is communicated to the operator server.

18. A method of operating a user device to communicate with an operating server, comprising the steps of:
identifying an input made by a user of the user device, wherein the input is provided by a hidden option in a third party application running on the user device, in which a prompt for the input is concealed within the third party application;
in response, initiating data communication with the operating server, wherein the data communication includes communication via a network;
obtaining video data from a camera of the user device and audio data from a microphone of the user device;
communicating the video data and audio data to the operating server, wherein, in a low bandwidth case, the user device buffers at least the video data and communicates it in chunks; and
in response to identifying that an interaction mode of a session associated with the data communication, enabling direct communication between the user and an operating interface associated with the operating server,
wherein the user device is configured to begin communication of at least the video data before identifying the interaction mode and is configured to continue communicating at least the video data after identifying the interaction mode such that, when in the interaction mode, the user of the user device and an operator of the operator interface are enabled to communicate with one another.

19. A communication system comprising one or more user devices, an operator server interfaced with an operator interface and a data storage, wherein the one or more user devices are configured for communication with the operator server via a network, and wherein each user device is configured to:
identify an input made by a user of the user device, wherein the input is provided by a hidden option in a third party application running on the user device, in which a prompt for the input is concealed within the third party application;
in response, initiate data communication with the operator server, wherein the data communication includes communication via the network;
obtain video data from a camera of the user device and/or audio data from a microphone of the user device;
communicate the video data and/or audio data to the operator server, wherein, in a low bandwidth case, the user device buffers the video and/or audio data and communicates it in chunks; and
in response to identifying that an interaction mode of a session associated with the data communication, enable direct communication between the user and an operating interface associated with the operator server, and
wherein the operator server is configured to:
receive a request to initiate data communication from the user device and in response, initiating said data communication;
receive video data and/or audio data from the user device;
record the video data and/or audio data in the data storage;
initiate a session with the operator interface, wherein the session is initially in a pre-interaction mode;
in response to receiving an instruction from the operator interface to change the session to an interaction mode, control the operator interface in order to change the session to the interaction mode,
wherein, when in the interaction mode, the operator interface is in direct communication with the user device such that the user of the user device and an operator of the operator interface are enabled to communicate with one another, and wherein the operator server is configured to begin recording of the video data and/or audio data before controlling the operator interface to change to the interaction mode and to continue recording received video data and/or audio data after said change.

20. A system as claimed in claim 19, the user device configured to obtain and communicate at least video data.

* * * * *